Oct. 15, 1940.  J. R. BROCK  2,218,162
CONDENSER ELECTRODE TERMINAL
Filed April 14, 1939
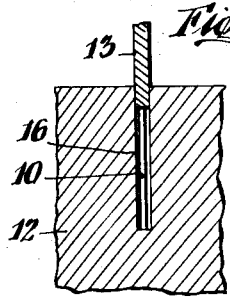
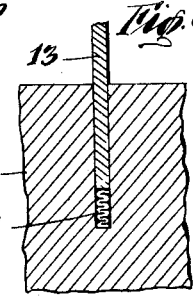
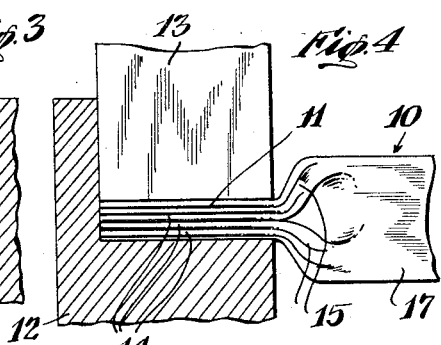
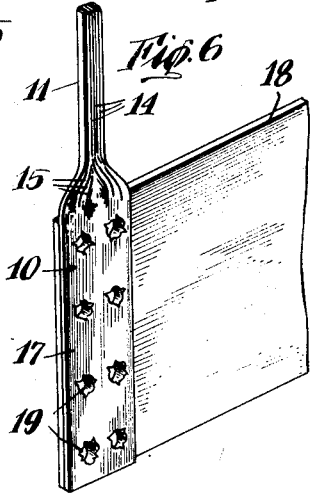
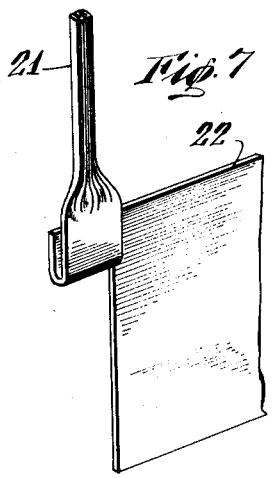
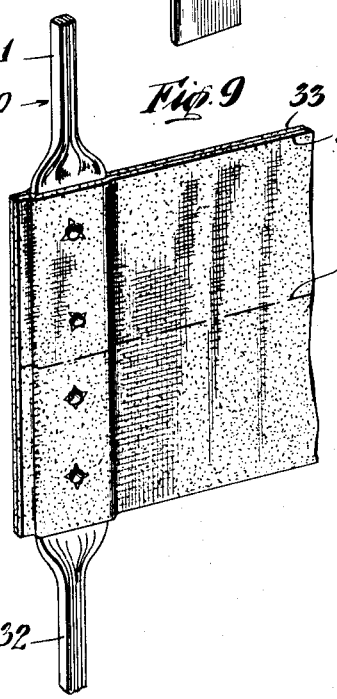
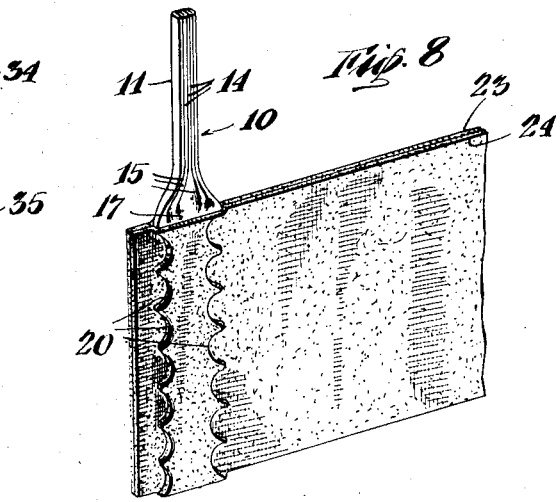
INVENTOR
James R. Brock
BY
ATTORNEY Patented Oct. 15, 1940

2,218,162

UNITED STATES PATENT OFFICE 2,218,162

CONDENSER ELECTRODE TERMINAL

James R. Brock, Indianapolis, Ind., assignor to P. R. Mallory & Co., Inc., Indianapolis, Ind., a corporation of Delaware Application April 14, 1938, Serial No. 201,863

1 Claim. (Cl. 175—315)

This invention relates to terminals for the electrodes of electric condensers.

An object of the invention is to improve the terminal construction for electric condenser electrodes, particularly for electrodes of electrolytic condensers.

Other objects of the invention will be apparent from the following description and accompanying drawing taken in connection with the appended claim.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a perspective view of a piece of sheet metal stock for use in producing a terminal according to the present invention.

Figures 2, 3 and 4 show parts of the apparatus and process for forming the terminal;

Figure 5 shows a completed terminal;

Figure 6 shows a terminal attached to a condenser electrode;

Figure 7 shows a modified terminal electrode arrangement;

Figure 8 shows another form of electrode attached to another terminal; and

Figure 9 shows a further form.

According to a preferred means of carrying out the invention the electrode terminal is formed from a strip of relatively thin sheet stock, a portion of which is compressed together to form a part of greater thickness and mechanical strength. The invention is applicable to terminals for the electrodes of electric condensers generally, and is particularly suitable for terminals for the electrodes of dry electrolytic condensers.

While a preferred embodiment of the invention is described herein, it is contemplated that considerable variation may be made in the method of procedure and the construction of parts without departing from the spirit of the invention. In the following description and in the claim, parts will be identified by specific names for convenience, but they are intended to be as generic in their application to similar parts as the art will permit.

Referring to the drawing, Figure 1 shows a thin strip of metal 10 suitable for use in producing the terminal. If the terminal is to be used for dry electrolytic condensers, for example, the strip 10 may comprise a strip of aluminum foil about one-half inch wide and several inches long and a few mils thick. In some cases it will be desirable to prepare the surface of the foil by etching or other roughening processes to subsequently enable better bonding to the condenser electrode.

In forming the terminal, one end of metal strip 10 is inserted in a slot 16 in a block 12 and laterally compressing the strip by a flat slide 13 which presses against one edge of the strip as shown in Figures 2, 3 and 4. As slide 13 compresses the end of strip 10 it forms a series of longitudinal ribs therein which are further compressed together until a solid compact section is formed having a series of longitudinal folds 14 therein, as shown in Figure 4, for example. The free end of strip 10 remains as it was originally and a series of diverging ribs 15 form naturally in the region between the compressed end and the free end as shown in Figure 4. These ribs 15 serve to strengthen this region.

Figure 5 shows the completed terminal member comprising the flat section 17 corresponding to the original strip and the compressed end 11 which is of considerably greater thickness than the original strip and also of greater strength. The section 11 will have an almost rectangular cross-section and the folds 14 therein will be almost unnoticeable if the pressure used in compressing the end is sufficient. The compressed end 11 will also become strain-hardened to some extent by the compressing operation. This may be an advantage in some cases. If, however, the original softness of the metal is desired it may readily be annealed by simply passing the terminal 11 momentarily through a gas flame.

Figure 6 shows the terminal 10 attached to a foil electrode 18 by placing the thin flat portion 17 of the terminal against the electrode foil 18 and punching several holes 19 therethrough and then meshing down the burrs produced by the punching operation.

It will be noted that the diverging ribs 15 are located just beyond the edge of the electrode 18 thereby serving to strengthen the terminal member in the region where the greatest strain is applied to it.

Figure 7 shows a modification wherein the terminal portion 21 is formed directly from the foil electrode 22 by cutting the tab at the end of the electrode foil strip and compressing the end of the tab together to form a heavy securing portion 21 similar to the portion 11 previously described.

Figure 8 shows a modified form of terminal and how the terminal may be attached to an electrode formed of metal sprayed onto a fibrous base, such as cloth or gauze. This terminal is similar to terminal 10 of Figure 5 but has serrated or scalloped edges 20 formed in the portion 17. According to this arrangement the serrated portion 17 of terminal 10 is inserted between two strips of gauze 23 and 24, after which a suitable electrode metal such as aluminum is sprayed onto both gauze layers by a metal spray gun. The sprayed metal penetrates through the gauze to some extent, provided it is sufficiently open-mesh, thereby bonding the two layers of gauze together and bonding the electrode terminal between them. For this form of electrode, it is preferred that the surface of the terminal 10 be etched or otherwise roughened so that the sprayed metal will adhere to it.

Due to the scallops or serrations in its edges the portion 17 of the terminal will flex more readily with the electrode when it is wound into a condenser assembly and will distribute the bending over a wider region. Hence no straight line edge will be present where cracking or straining of the electrode or its connection to the terminal can occur. The irregular edge also gives a greater contact area between the edge of the tab and the anode, decreasing current concentration.

Figure 9 shows another form of assembly in which a terminal member 30 is used similar to terminal 10 except that both of its ends are compressed together as previously described to form terminal portions 31 and 32. This terminal may be utilized by inserting it between two gauze layers 33 and 34, as shown in Figure 9, and spraying the two layers with electrode metal as previously described. The resulting electrode terminal member will then have terminals projecting from both edges. It may be cut in two along the center line 35 to form two similar electrodes. If desired the terminal 30 may be secured to one of the gauze layers 34 by punching before the spray-deposit is applied.

The terminal portion 11, 21 or 31 of the electrode terminal may be used as a connecting terminal for the electrode in any one of several well-known manners. For example, the terminal portion may be passed through an aperture in the top of the condenser container and clamped to a soldering lug.

The terminal element produced according to this invention has the advantage of providing a thinner and more flexible portion for connection between the terminal member and the electrode and a thicker, stiffer portion for connection between the terminal member and outside connecting means. The mid-portion where the diverging ribs appear is also strengthened by these ribs to reduce the possibility of the tab tearing at this point. The surface of the tab can be prepared in advance by etching or other processing to give the desired connecting surface.

While the present invention, as to its objects and advantages, has been described herein as carried out in specific embodiments thereof, it is not desired to be limited thereby but it is intended to cover the invention broadly within the spirit and scope of the appended claim.

What is claimed is:

A dry electrolytic condenser electrode-terminal assembly comprising an electrode sheet formed of a fibrous layer having a deposit of film-forming metal thereon and a terminal therefor comprising a strip of sheet metal laid flat against said electrode sheet and bonded thereto by said metal deposit, said terminal strip having serrated edges in the region bonded to said electrode sheet, the teeth of said serrated edges lying in substantially the same plane as the body of said terminal strip when said assembly is laid flat, and rendering said terminal strip more readily flexible with said electrode sheet during winding of said condenser.

JAMES R. BROCK.